(12) United States Patent
Tsai

(10) Patent No.: US 7,946,395 B1
(45) Date of Patent: May 24, 2011

(54) FRONT BRAKE OF RACING BICYCLE

(75) Inventor: Szu-Fang Tsai, Changhua (TW)

(73) Assignee: Tektro Technology Corporation, Changhua (TW)

( * ) Notice: Subject to any disclaimer, the term of this patent is extended or adjusted under 35 U.S.C. 154(b) by 0 days.

(21) Appl. No.: 12/762,387

(22) Filed: Apr. 19, 2010

(51) Int. Cl.
*B62L 3/00* (2006.01)

(52) U.S. Cl. .................................. 188/24.22; 188/24.12

(58) Field of Classification Search .... 188/24.11–24.22; 280/282.1
See application file for complete search history.

(56) References Cited

U.S. PATENT DOCUMENTS

| | | | | |
|---|---|---|---|---|
| 6,349,799 B1 * | 2/2002 | Kariyama | ................. | 188/24.22 |
| 6,945,368 B2 * | 9/2005 | Peyre | ....................... | 188/24.22 |
| 2005/0269165 A1 * | 12/2005 | Seymour | ................... | 188/24.12 |
| 2006/0185939 A1 * | 8/2006 | Tsai | ........................... | 188/24.12 |
| 2007/0068744 A1 * | 3/2007 | Tsai | ........................... | 188/24.12 |
| 2008/0035431 A1 * | 2/2008 | Vroomen et al. | .......... | 188/24.21 |

* cited by examiner

*Primary Examiner* — Christopher P Schwartz

(57) ABSTRACT

A front brake of a racing bicycle includes a first half part threadedly secured to a fork and comprising an upper first bifurcated member adapted to lockingly secure to a brake cable, an intermediate first through hole, a first brake pad mount releasably secured to the first through hole, and a first brake pad secured to the first brake pad mount; and a second half part threadedly secured to the fork and comprising an upper second bifurcated member adapted to lockingly secure to the brake cable, an intermediate second through hole, a second brake pad mount releasably secured to the second through hole, and a second brake pad secured to the second brake pad mount. The front brake is disposed behind the fork with no projecting lateral portions.

1 Claim, 8 Drawing Sheets

FRONT BRAKE OF RACING BICYCLE

BACKGROUND OF THE INVENTION

1. Field of Invention

The invention relates to bicycle brakes and more particularly to a front brake disposed behind a fork of a racing bicycle for reducing air resistance.

2. Description of Related Art

How to reduce air drag in order to increase speed is the main consideration of designing a racing bicycle. Lighter material is always pursued in the racing bicycle design. An aerodynamic shape is also important in designing a racing bicycle. The invention described below is directed to such effort, particularly the front brake.

SUMMARY OF THE INVENTION

It is therefore one object of the invention to provide a front brake disposed rearward of a fork of a racing bicycle comprising a first half part threadedly secured to the fork and comprising an upper first bifurcated member adapted to lockingly secure to a brake cable, an intermediate first through hole, a first brake pad mount releasably secured to the first through hole, and a first brake pad secured to the first brake pad mount; and a second half part threadedly secured to the fork and comprising an upper second bifurcated member adapted to lockingly secure to the brake cable, an intermediate second through hole, a second brake pad mount releasably secured to the second through hole, and a second brake pad secured to the second brake pad mount, wherein the front brake is disposed behind the fork with no projecting lateral portions.

The above and other objects, features and advantages of the invention will become apparent from the following detailed description taken with the accompanying drawings.

DETAILED DESCRIPTION OF THE INVENTION

Figure 1:
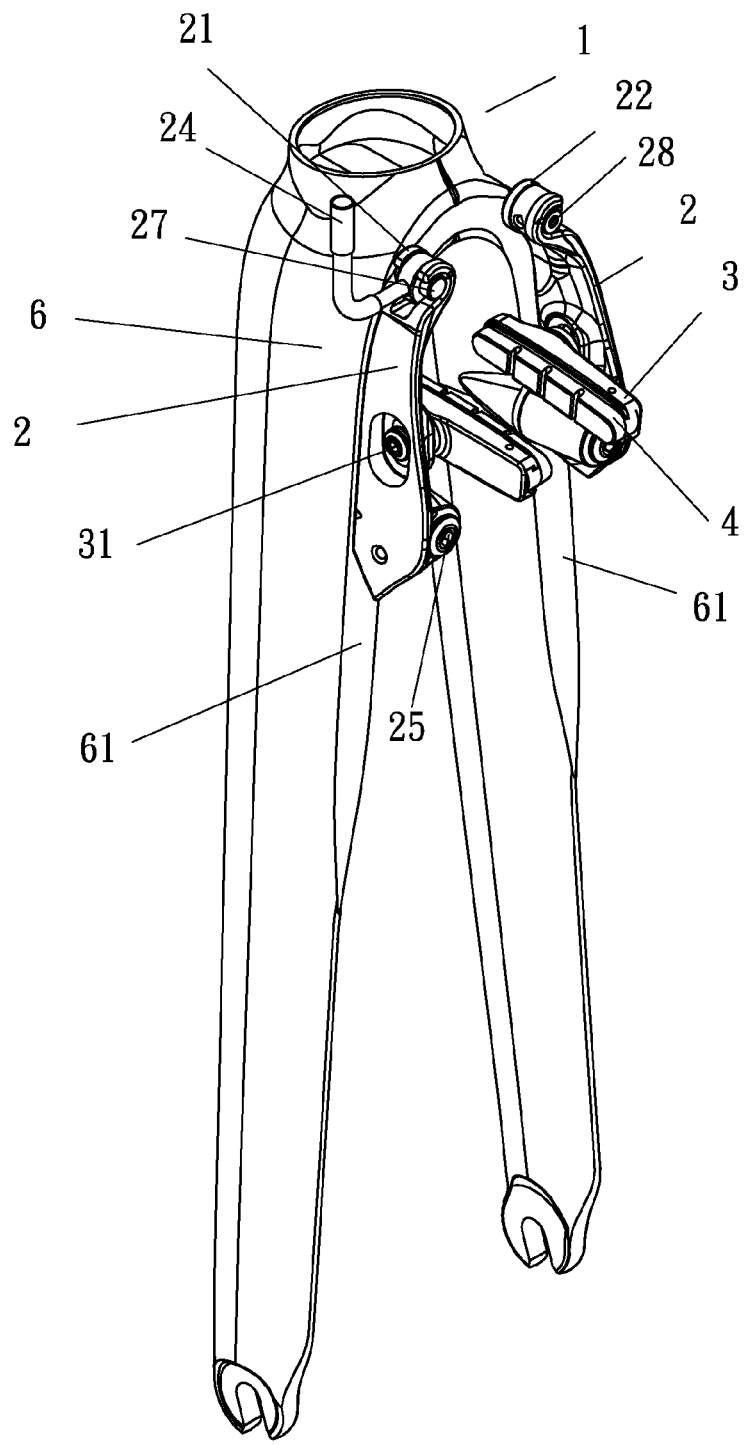
FIG. 1 is a perspective view of a front brake of a racing bicycle according to the invention, the brake being disposed behind a fork and adjacent thereto.
Figure 2:
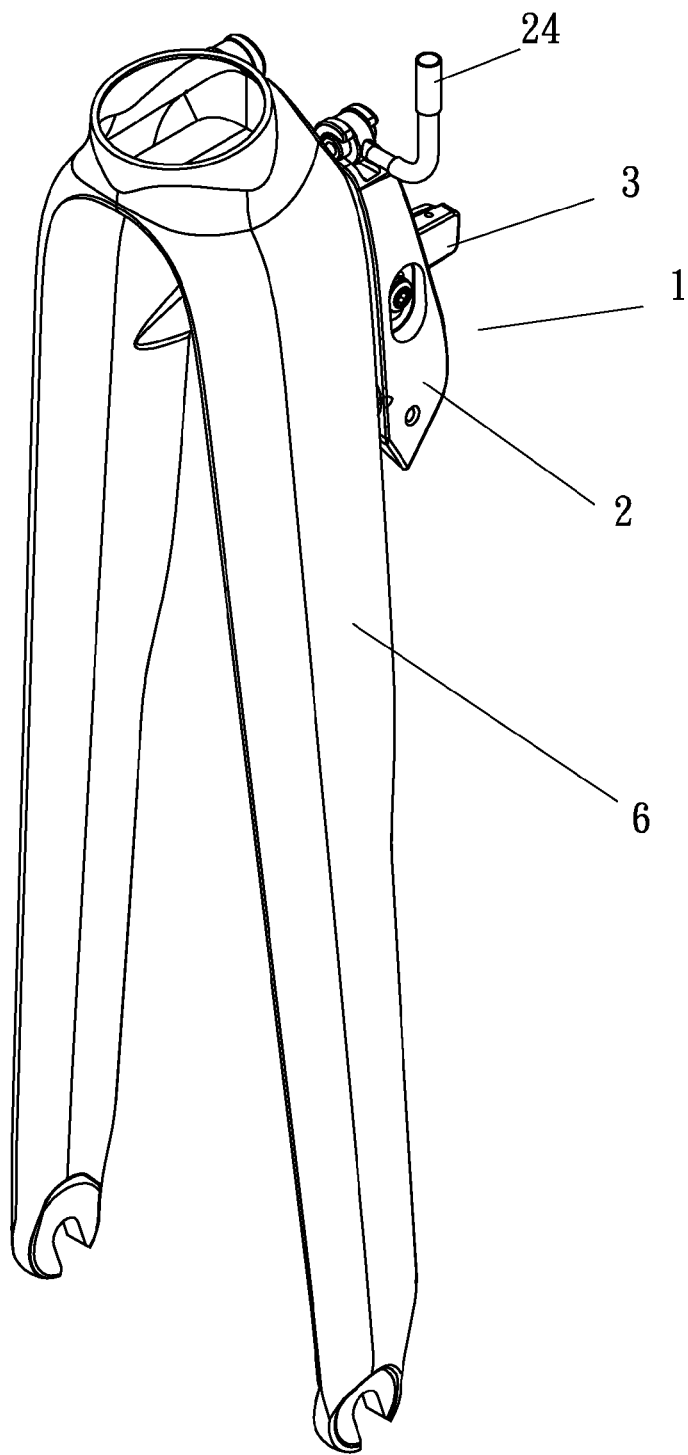
FIG. 2 is another perspective view of FIG. 1 but viewing from another angle.
Figure 3:
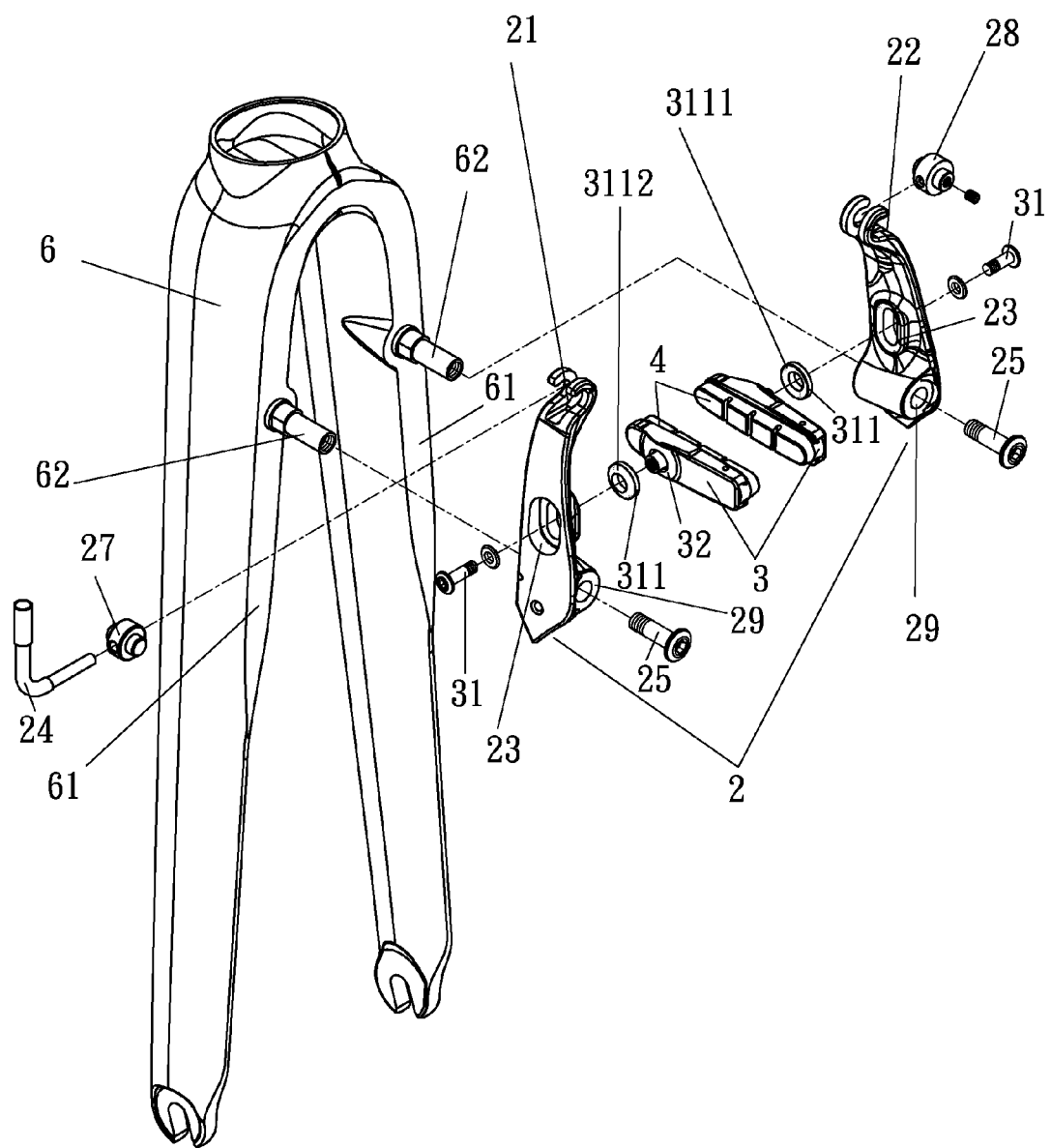
FIG. 3 is an exploded view of the brake.
Figure 4:
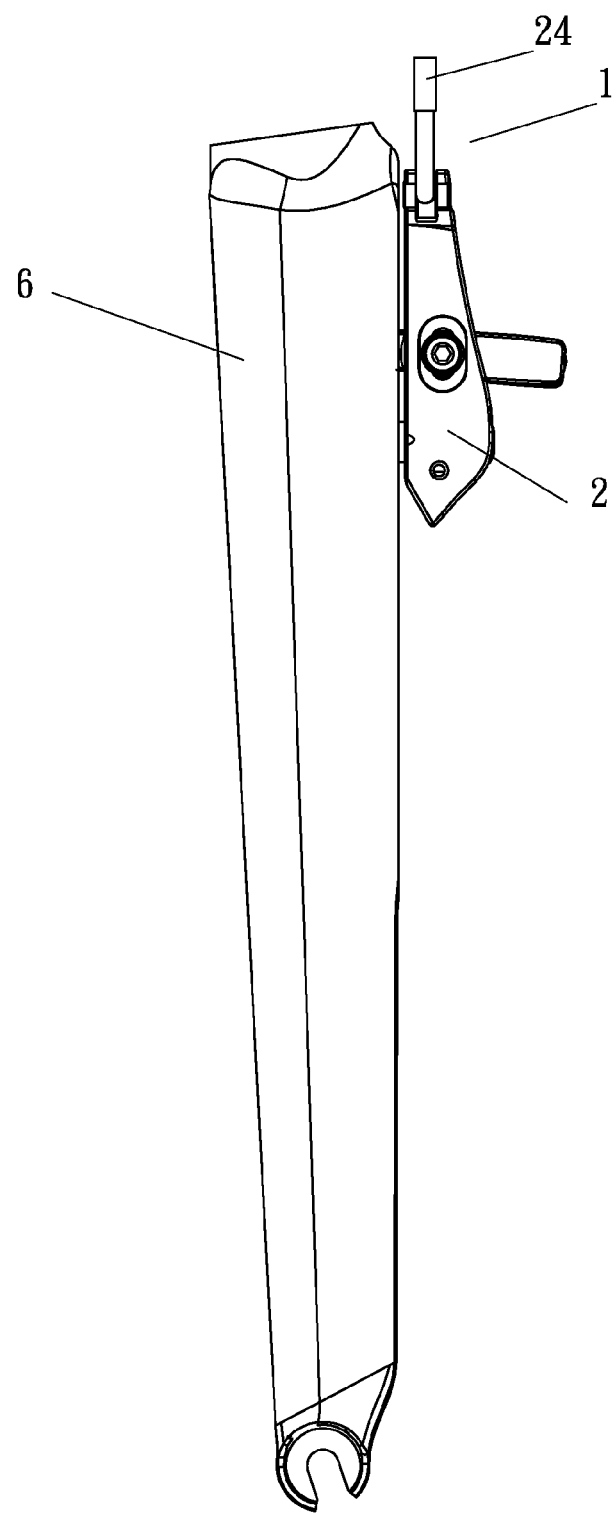
FIG. 4 is a side view of FIG. 1.

Referring to FIGS. 1 to 7, a front brake 1 of a racing bicycle in accordance with the invention is shown. A fork 6 comprises an arc-shaped rear portion 61 having two opposite, bossed, threaded holes 62 extending rearward. The brake 1 comprises the following components as discussed in detail below.

One longitudinally elongated brake caliper arm 2 comprises an upper bifurcated member 21 adapted to fasten a brake cable 24 by means of a brake cable lock 27, an intermediate through hole 23, a brake pad mount 3 having a convex outer portion 32, a washer 311 having a concave inner surface 3111 and a convex outer surface 3112, and a brake pad 4 secured to the brake pad mount 3. The brake pad mount 3 is releasably secured onto the through hole 23 by driving a screw 31 through the through hole 23 and the washer 311 into a bossed, threaded hole in the convex outer portion 32 in which the concave inner surface 3111 of the washer 311 is matingly engaged with the convex outer portion 32 and the convex outer surface 3112 is matingly engaged with a concave portion on one end of the through hole 23. The brake caliper arm 2 further comprises a protruded lower channel 29. A screw 25 can be driven into the channel 29 to secure to the threaded hole 62 for fastening the brake caliper arm 2 and the fork 6 together.

Likewise, the other longitudinally elongated brake caliper arm 2 comprises an upper bifurcated member 22 with a brake cable lock 28 fastened therein. Moreover, an end portion 26 of the brake cable 24 is further fastened between the bifurcated members 21 and 22 (see FIG. 6).

The other longitudinally elongated brake caliper arm 2 further comprises an intermediate through hole 23, a brake pad mount 3 having a convex outer portion 32, a washer 311 having a concave inner surface 3111 and a convex outer surface 3112, and a brake pad 4 secured to the brake pad mount 3. The brake pad mount 3 is releasably secured onto the through hole 23 by driving a screw 31 through the through hole 23 and the washer 311 into a bossed, threaded hole in the convex outer portion 32 in which the concave inner surface 3111 of the washer 311 is matingly engaged with the convex outer portion 32 and the convex outer surface 3112 is matingly engaged with a concave portion on one end of the through hole 23. The other brake caliper arm 2 further comprises a protruded lower channel 29. A screw 25 can be driven into the channel 29 to secure to the threaded hole 62 for fastening the other brake caliper arm 2 and the fork 6 together.

The brake pads 4 are adapted to compress against a wheel rim 7 for braking a racing bicycle as known in the art.

Preferably, a distance L between centers of two threaded holes 62 is in a range of 59 mm and 63 mm.

Preferably, a distance H between centers of the brake cable lock 27 and the threaded hole 62 of the same side is in a range of 60 mm and 70 mm.

Figure 6:
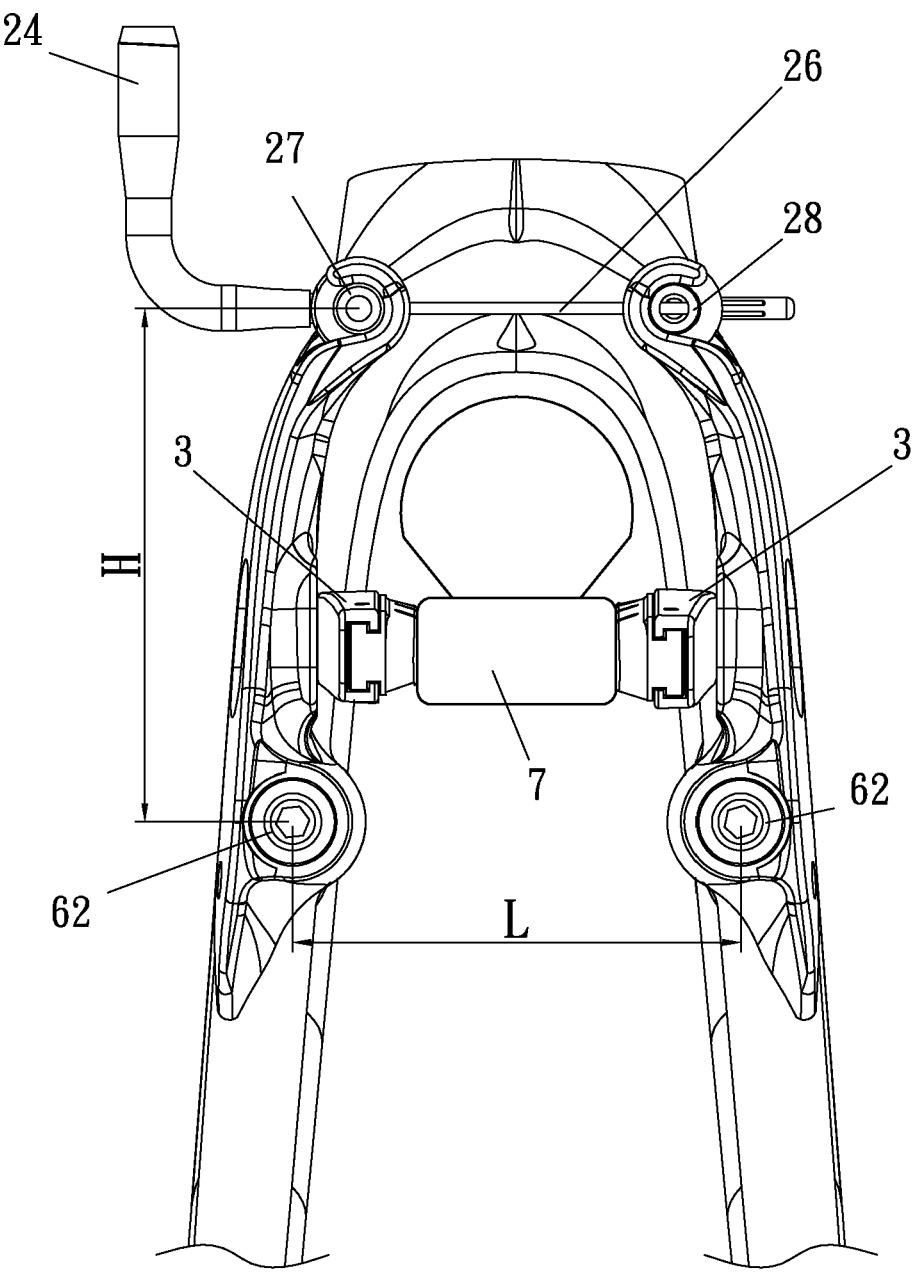
FIG. 6 is a view similar to FIG. 5 but without washers.
Figure 7:
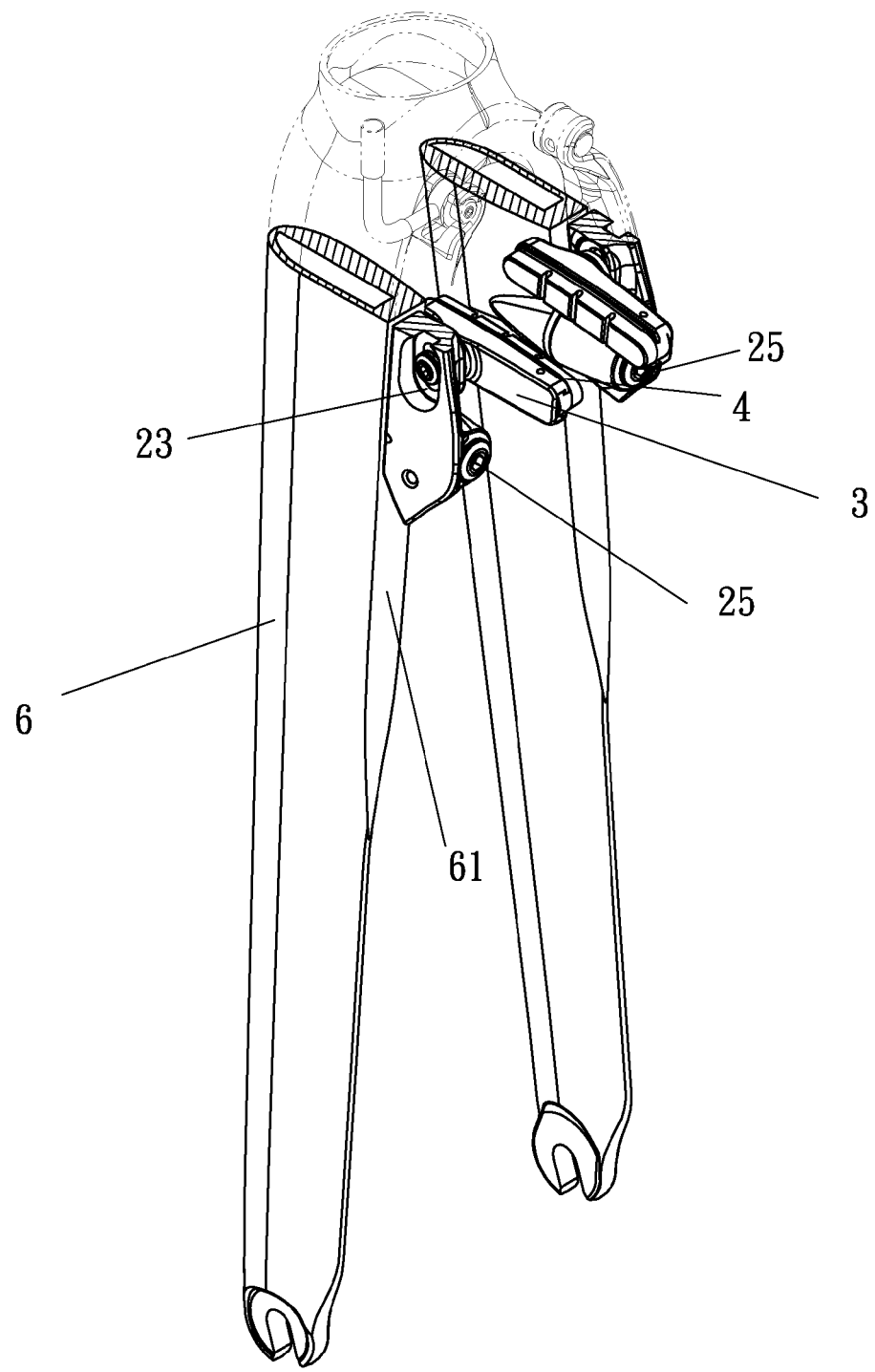
FIG. 7 is a view similar to FIG. 1 with an upper portion of the fork shown in cross-section.

Alternatively, the washers 311 can be eliminated with the convex outer portions 32 of the brake pad mounts 3 matingly engaged with concave portions on the other ends of the through holes 23 (see FIG. 6).

Figure 8:
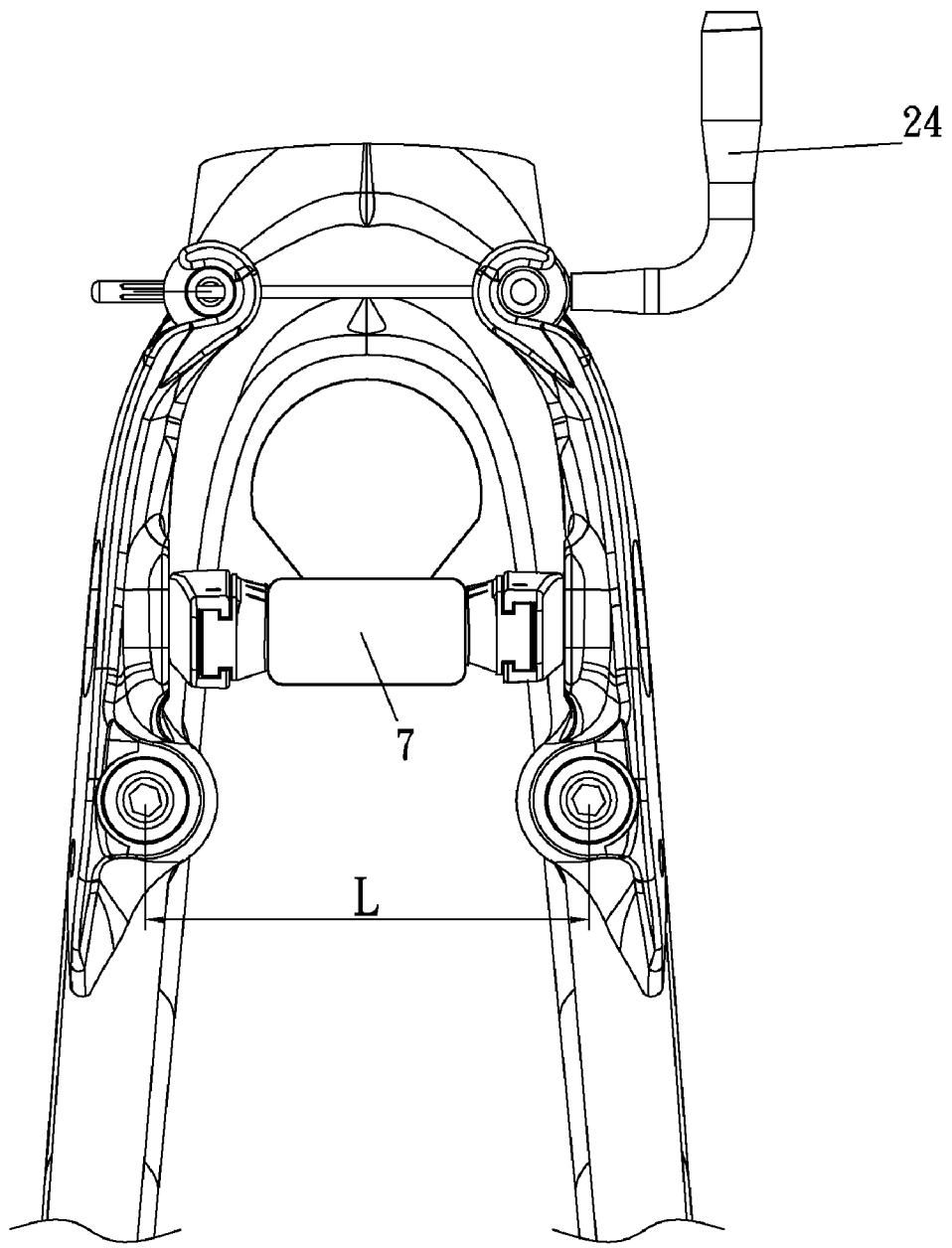
FIG. 8 is a rear view of an upper portion of the fork and the brake with the brake cable being disposed in the right opposite to that shown in FIG. 5.

Referring to FIG. 8, a rear view of an upper portion of the fork and the brake is shown. The brake cable 24 of this configuration is fastened at the right side opposite to that shown in FIG. 5.

Figure 5:
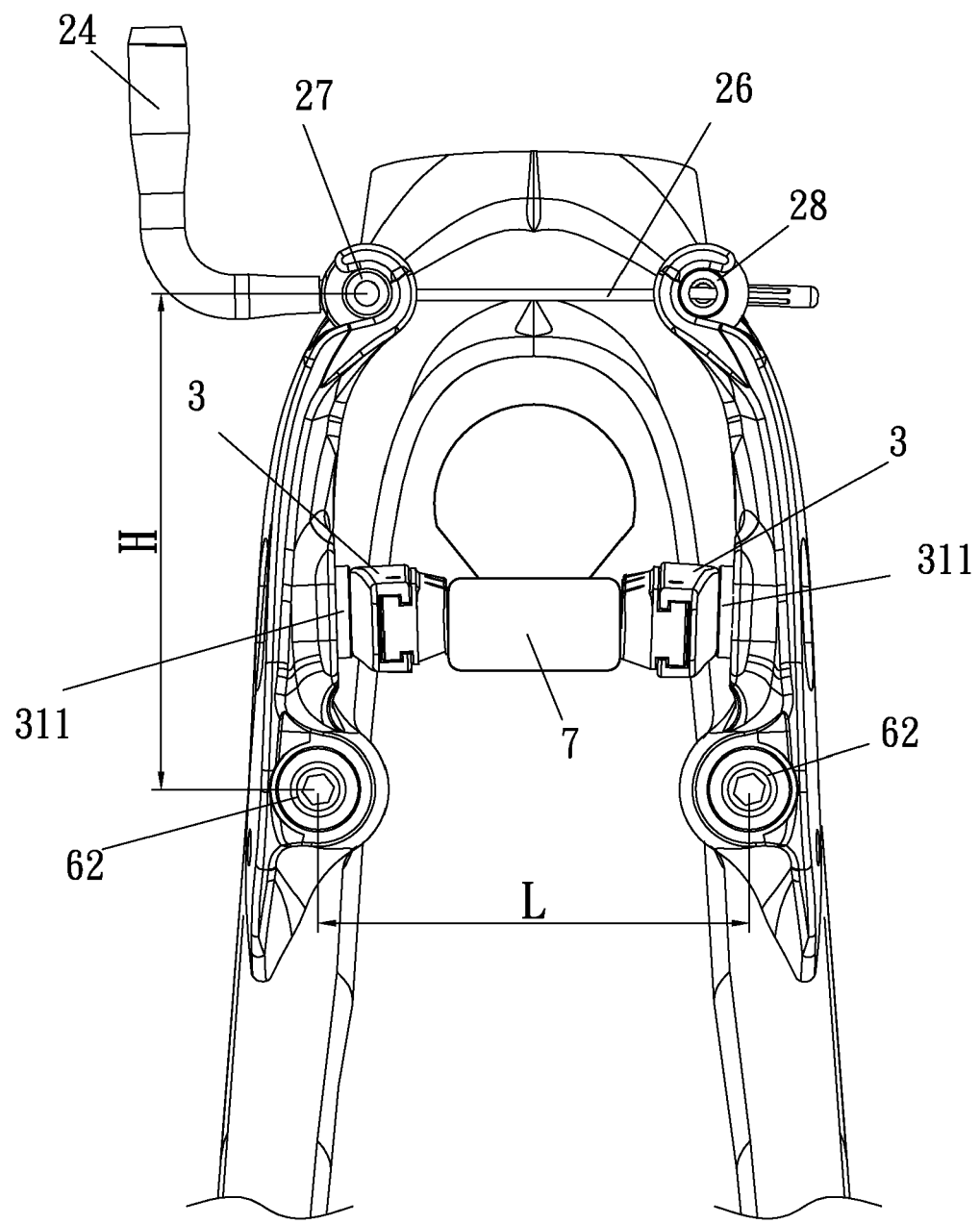
FIG. 5 is a rear view of an upper portion of FIG. 1 with washers mounted thereon.

As shown in FIG. 5, the front brake 1 is disposed behind the fork 6 with no projecting lateral portions (i.e., the front brake 1 being substantially hidden by the fork 6 when viewing from a front end of the bicycle). Therefore, air resistance of the front brake and the fork can be reduced to a minimum.

While the invention herein disclosed has been described by means of specific embodiments, numerous modifications and variations could be made thereto by those skilled in the art without departing from the scope and spirit of the invention set forth in the claims.

What is claimed is:

1. A front brake of a racing bicycle comprising:
   a first half part threadedly secured to a fork and comprising an upper first bifurcated member adapted to lockingly secure to a brake cable by means of a brake cable lock, an intermediate first through hole, a first brake pad mount releasably secured to the first through hole, and a first brake pad secured to the first brake pad mount; and a second half part threadedly secured to the fork and comprising an upper second bifurcated member adapted to lockingly secure to the brake cable by means of another brake cable lock, an intermediate second through hole, a second brake pad mount releasably secured to the second through hole, and a second brake pad secured to the second brake pad mount, wherein the front brake is disposed behind the fork with no projecting lateral portions;

wherein the fork comprises an arc-shaped rear portion having two opposite, bossed, threaded holes extending rearward;

wherein a distance between centers of the two threaded holes is in a range of 59 mm to 63 mm; and wherein a distance between centers of one of the brake cables and the threaded hole of the same side is in a range of 60 mm to 70 mm.

\* \* \* \* \*